United States Patent
Neuroth et al.

[11] Patent Number: 5,821,452
[45] Date of Patent: Oct. 13, 1998

[54] COILED TUBING SUPPORTED ELECTRICAL CABLE HAVING CLAMPED ELASTOMER SUPPORTS

[75] Inventors: David H. Neuroth, Tulsa, Okla.; Don C. Cox, Roanoke, Tex.; Earl B. Brookbank, Claremore, Okla.

[73] Assignee: Baker Hughes Incorporated, Houston, Tex.

[21] Appl. No.: 818,543

[22] Filed: Mar. 14, 1997

[51] Int. Cl.⁶ .................................................... H01B 9/06
[52] U.S. Cl. ............................................ 174/28; 174/105 R
[58] Field of Search ............................. 174/105 R, 79, 174/89, 131 R, 28, 106 R; 417/423.3

[56] References Cited

U.S. PATENT DOCUMENTS

| | | | |
|---|---|---|---|
| 4,352,394 | 10/1982 | Zehren | 166/106 |
| 4,372,043 | 2/1983 | Cookson | 29/828 |
| 4,415,763 | 11/1983 | Cookson | 174/28 |
| 4,983,105 | 1/1991 | Mims, Sr. | 417/554 |
| 5,191,173 | 3/1993 | Sizer | 174/105 R |
| 5,269,377 | 12/1993 | Martin | 166/385 |
| 5,373,100 | 12/1994 | Arroyo et al. | 174/106 R X |
| 5,435,351 | 7/1995 | Head | 138/111 |
| 5,711,371 | 1/1998 | Bingham | 417/423.3 X |

*Primary Examiner*—Michael L. Gellner
*Assistant Examiner*—Marc D. Machtinger
*Attorney, Agent, or Firm*—James E. Bradley

[57] ABSTRACT

An electrical line for a well pump has elastomeric supports clamped to the exterior of electrical cable for supporting the cable within coiled tubing. The cable supports have an elastomeric member that swells when contacted with a hydrocarbon liquid. Each expansion member is clamped to the cable exterior by retainers located at the ends. The expansion members are spaced apart longitudinally along the cable, and then the cable is inserted into the coiled tubing. Hydrocarbon liquid is pumped through the coiled tubing to cause the expansion members to swell into frictional engagement with the coiled tubing. The retainers direct the swelling laterally into tight contact with the coiled tubing.

20 Claims, 3 Drawing Sheets

COILED TUBING SUPPORTED ELECTRICAL CABLE HAVING CLAMPED ELASTOMER SUPPORTS

TECHNICAL FIELD

This invention relates in general to power cable for electrical submersible well pumps and in particular to an electrical cable installed within a string of coiled metal tubing.

BACKGROUND ART

Conventional electrical submersible well pumps for oil and deep water wells are supported on a string of production tubing. The production tubing comprises sections of steel pipe screwed together, each section being about thirty feet in length. The pump is a centrifugal pump driven by an AC motor located below the pump. A power cable extends from the surface alongside the tubing for supplying power to the motor. The power cable is strapped to the tubing at frequent intervals to support the weight of the power cable.

One disadvantage of the conventional pump assembly described above is that when the pump must be pulled for repair or replacement, the procedure is expensive. The operator needs a workover rig with the capability of pulling the sections of tubing. Pumps of this nature must be pulled typically at least every eighteen months. Considering the cost of the workover rig as well as the down time for the well, the periodic expense is significant.

A few installations have been made employing coiled tubing. Coiled tubing is a continuous string of metal tubing which is brought to the well site on a large reel. The coiled tubing unit unreels the tubing and forces it into the well. Coiled tubing has been used for various purposes in the past, and recently used to suspend electrical submersible pumps. An advantage of a coiled tubing supported pump is that it does not need a workover rig to pull it. Also, pulling and replacing it should be faster than production tubing.

One proposal in the past was to produce production fluid from the pump through the coiled tubing and strap the cable to the exterior of the coiled tubing. A disadvantage of this assembly is that a separate reel is needed for the power cable. Securing the straps would slow down the installation and pulling procedure. Furthermore, commercially available coiled tubing is not large enough in diameter for desired production in many cases.

Some installations have been made with the electrical cable installed within the coiled tubing. Production fluid from the pump flows through a casing surrounding the coiled tubing. The electrical cable is a three-phase cable having fairly large metal conductors. The weight of the cable is such that it will not support itself in a deep well. Even if inserted within coiled tubing, the weight of the electrical cable needs to be supported by the coiled tubing. In one type of installation, separate mechanical anchors are spaced along the length of the insulated electrical cable. The cable is inserted into the coiled tubing with the anchors retracted. The anchors are then shifted to a weight supporting position, gripping the inner diameter of the coiled tubing. U.S. Pat. No. 5,435,351, Head, Jul. 25, 1995, describes such a system.

Another proposal shown in U.S. Pat. No. 5,191,173, Sizer et al, Mar. 2, 1993, describes using an elastomeric jacket of a type that will swell when exposed to a hydrocarbon liquid. The jacket is extruded over the insulated conductors during manufacturing. The jacketed electrical cable is then inserted into the coiled tubing. Then liquid hydrocarbon is pumped into the annular space surrounding the jacket, causing it to swell to frictionally grip the coiled tubing. Although the swelling is not instantaneous, it can occur rapidly enough to block the annular clearance before the hydrocarbon is able to completely flow through the annular space within several thousand feet of coiled tubing. The Sizer et al patent, identified above, shows various embodiments to avoid the jacket from swelling so as to block the flow of the hydrocarbon before the hydrocarbon reaches the end of the coiled tubing. These embodiments include the use of metal strips and placing holes in the coiled tubing itself.

DISCLOSURE OF INVENTION

The electrical line of this invention has an electrical cable supported within coiled tubing by clamped elastomeric supports. Each cable support has an expansion member of a material that swells when contacted by a hydrocarbon liquid. The cable supports have retainers which are clamped to the exterior of the cable, longitudinally spaced from other cable supports. Each retainer locates at one end of each expansion member and is made up of two halves. Each half has a semi-cylindrical recess. Fasteners are employed to clamp the retainers to the electrical cable.

The retainers are of material which does not swell upon application of hydrocarbon liquid. After the cable has been inserted into the coiled tubing, hydrocarbon liquid will be pumped through the tubing. The expansion members swell to frictionally grip the inner diameter of the coiled tubing and the outer diameter of the electrical cable. The retainers resist longitudinal expansion of the expansion members to assure tight gripping and limit the amount of hydrocarbon absorbed by the expansion members. The expansion members transfer load from the cable to the coiled tubing.

In one embodiment, a pair of tension rods extend between the retainers on opposite ends of each expansion member. The tension rods prevent the retainers from moving longitudinally apart from each other due to the expansion force of the expansion member.

In another embodiment, a semi-cylindrical interior portion of each retainer has grooves which mate with a metal armor strip wound helically around the cable. Preferably, the expansion member also has helical grooves in its interior for mating with the helical strip.

To assure that hydrocarbon liquid is able to pass through the expansion members from one end of the tubing to the other, flow passages are provided. In the first embodiment, the flow passage is preferably through the center of one of the tension rods. In the second embodiment, a separate tube extends between the end caps and partially through the expansion member to convey fluid.

BEST MODES FOR CARRYING OUT THE INVENTION

Figure 1:
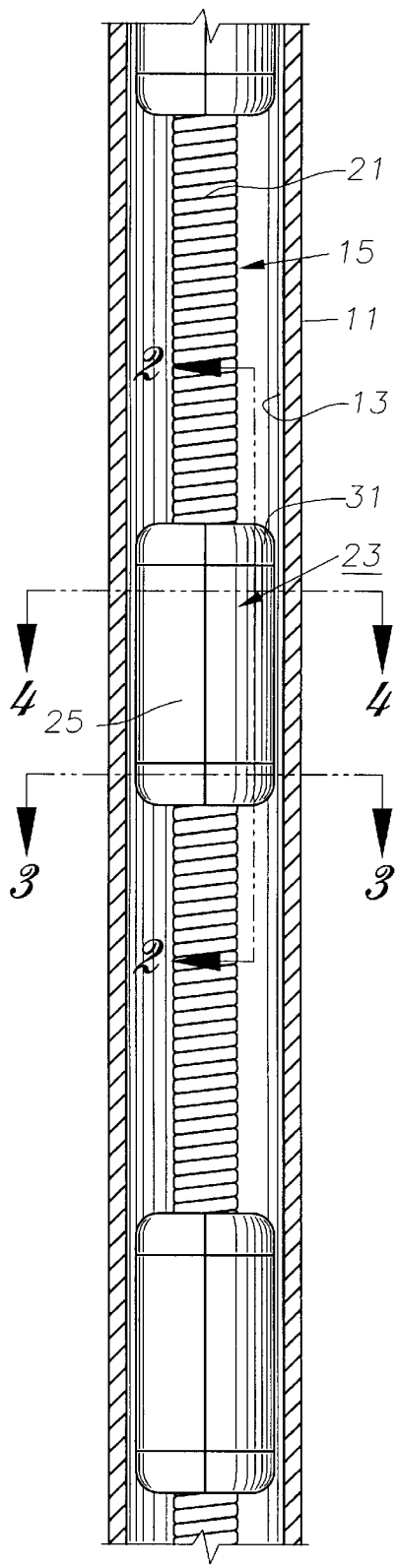
FIG. 1 is a partial sectional view illustration an electrical cable located within coiled tubing and prior to the cable supports being activated.
Figure 4:
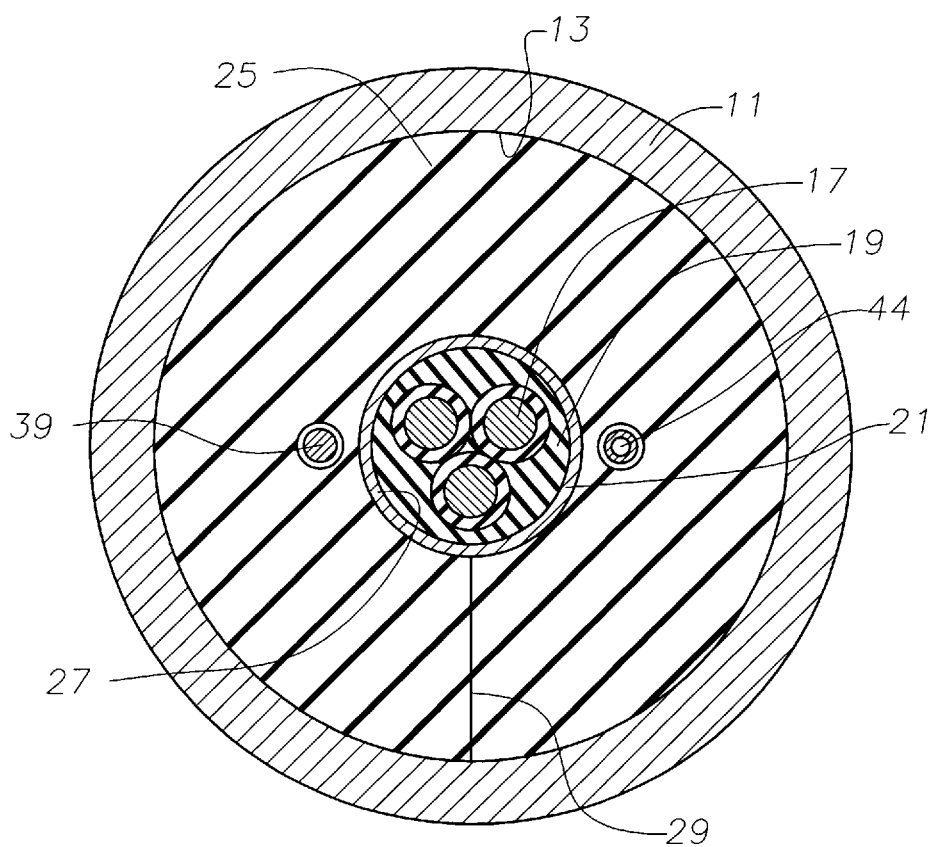
FIG. 4 is a sectional view of one of the cable supports of FIG. 1, taken along the line 4—4 of FIG. 1 and shown after cable support has swelled into engagement with the coiled tubing.

Referring to FIG. 1, an electrical power line for a submersible pump includes a string of continuous coiled tubing 11. Coiled tubing 11 is steel, has an inner diameter 13, and is conventional. Coiled tubing 11 is capable of being wound on a large reel for transport to a well site, then forced into the well. An electrical cable 15 shown inserted through the length of coiled tubing 11. Electrical cable 15 is of a type particularly for supplying AC power from the surface to a downhole motor for driving a centrifugal pump which located at the lower end of coiled tubing 11. As shown in FIG. 4, electrical cable 15 has three insulated conductors 17. A jacket 19 of a conventional rubber material is extruded over the three insulated conductors 17. Jacket 19 has a cylindrical exterior and is of a material such as Nitrile rubber, which resists swelling when exposed to hydrocarbon liquid. Armor 21 comprising a steel strip is helically wrapped around jacket 19 in a conventional manner.

Referring again to FIG. 1, cable supports 23 are mounted to electrical cable 15 along its length for transferring the weight of electrical cable 15 to coiled tubing 11. Cable supports 23 are spaced apart from each other as needed, for example 200–300 feet, to provide adequate transfer of the weight of cable 15 to coiled tubing 11. Each cable support 23 is approximately 18 to 24 inches in length in the preferred embodiment. The outer diameter of each cable support 23 is initially less than inner diameter 13 so as to allow electrical cable 15 to be readily inserted into coiled tubing 11. The initial annular clearance between the outer diameter of cable supports 23 and inner diameter 13 depends on the outer diameter of electrical cable 15 and the inner diameter of coiled tubing 11. Preferably, the initial annular clearance is at least 0.090 inch on each side.

Figure 2:
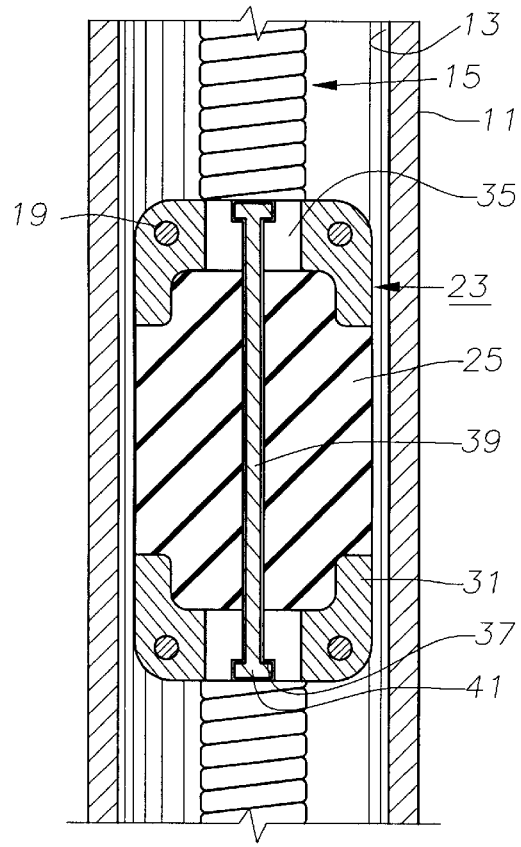
FIG. 2 is an enlarged sectional view of one of the cable supports of FIG. 1, taken along the line 2—2 of FIG. 1.
Figure 3:
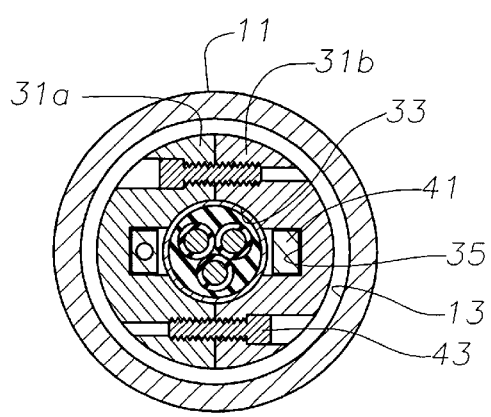
FIG. 3 is an enlarged sectional view of one of the cable supports of FIG. 1, taken along the line 3—3 of FIG. 1.

Referring to FIGS. 2–4, each cable support 23 includes an elastomeric expansion member 25. In the preferred embodiments, expansion member 25 is a molded sleeve which has a bore 27 with an inner diameter for closely receiving electrical cable 15. A slit 29 extends radially from bore 27 to the exterior of expansion member 25 to allow it to be placed around cable 15. Expansion members 25 are formed of an elastomer which has a property of swelling significantly when exposed to hydrocarbon liquid, such as an EPDM (ethylene propylene diene monomer).

Expansion members 25 are prevented from expanding longitudinally by retainers 31, which form a part of each cable support 23. One of the retainers 31 is on each end of each expansion member 25. Each retainer 31 is formed in two halves 31a, 31b which clamp to cable 15 adjacent each end of each expansion member 25. Retainers 31 are of a material that does not swell when contacted by hydrocarbon liquid. Retainers 31 are rigid and of fairly high strength material such as steel. Each retainer half 31a, 31b has a semi-cylindrical recess 33 which is formed on a diameter for closely receiving electrical cable 15.

Additionally, in the embodiment of FIGS. 1–4, each retainer 31 has a lateral recess 35 that extends laterally outward from semi-cylindrical recess 33. A load shoulder 37 perpendicular to the longitudinal axis is formed in each lateral recess 35. A pair of tension rods 39 extend between retainer halves 31a, 31b. Each tension rod 39 has a head 41 which locates on load shoulder 37. Tension rods 39 are also resistant to swelling due to hydrocarbon liquid and are of a fairly strong material such as steel. Tension rods 39 prevent the two retainers 31 of each expansion member 25 from moving apart from each other under high oppositely acting longitudinal forces created due to the swelling of the expansion member 25. Tension rods 39 extend through holes formed in expansion sleeve 25.

Threaded fasteners 43 are employed to clamp retainers halves 31a, 31b together tightly around electrical cable 15. As shown in FIG. 4, one of the tension rods 39 is hollow, having a flow passage 44 extending through it. Passage 44 allows for the flow of hydrocarbon liquid past expansion member 25 even after it has swelled into engagement with inner diameter 13 as shown in FIG. 4.

In the method of assembly of the embodiment FIGS. 1–4, technicians will install cable supports 23 on electrical cable 15 at selected intervals. Expansion members 25 will be placed around cable 15. The technician will place the two halves of retainers 31 around electrical cable 15, position tension rods 39, and tightly secure retainer halves 31a, 31b together with fasteners 43.

Electrical cable 15 is then inserted within coiled tubing 11. This may be done in one method by pushing a stiff wire from one end of coiled tubing 11 out the other. Then electrical cable 15 will be connected to the protruding end of the rigid wire and the wire will be winched back onto a reel, drawing electrical cable 15 through coiled tubing 11. Then, hydrocarbon liquid, such as diesel fuel, is pumped through coiled tubing 11. The liquid flows through the clearances around cable supports 23 and also through flow passages 44. The hydrocarbon liquid causes expansion members 25 to swell. Expansion members 25 will tightly and frictionally grip inner diameter 13 of coiled tubing 11 and the outer diameter of electrical cable 15. It is desirable to direct all of the swelling radially outward from electrical cable 15, and not longitudinally, so as to assure a very high gripping force and to limit the amount of hydrocarbon absorbed by each expansion member 25. Retainers 31 resist longitudinal expansion of expansion members 25 due to the tight engagement of retainers 31 with electrical cable 15 through fasteners 43 and due to tension rods 39.

Figure 5:
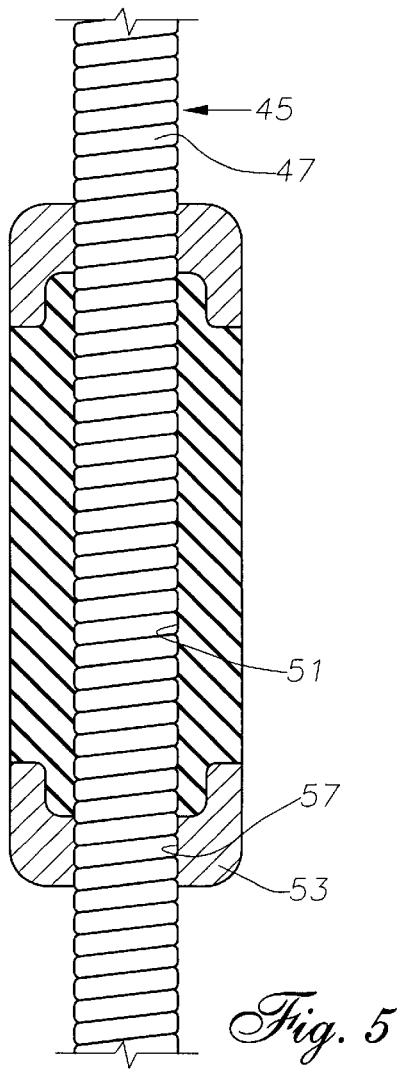
FIG. 5 is a sectional view of a second embodiment of a cable support constructed in accordance with this invention.
Figure 6:
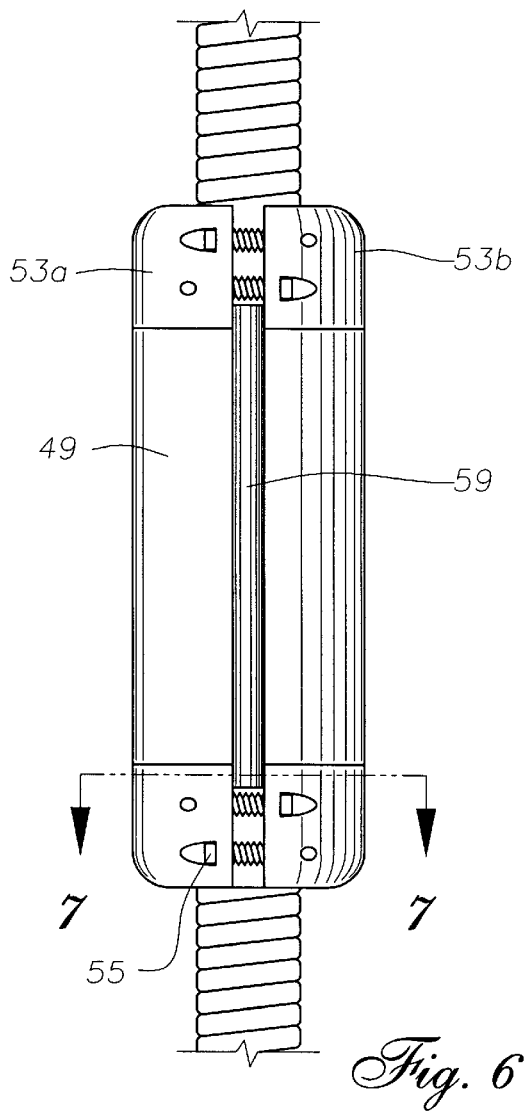
FIG. 6 is a side elevational view of the cable support of FIG. 5.
Figure 7:
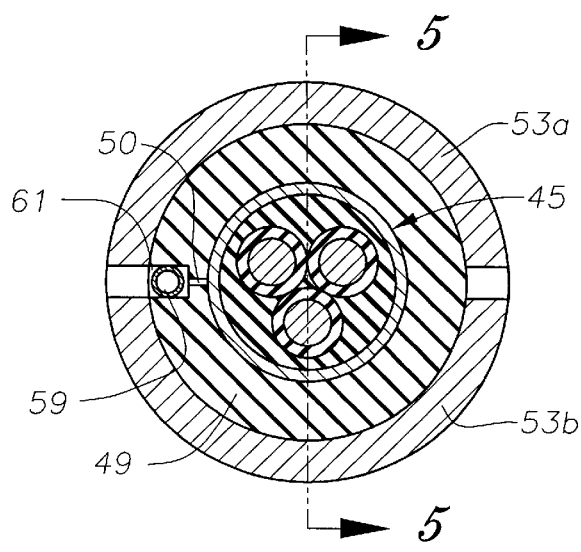
FIG. 7 is a sectional view of the cable support of FIG. 5, taken along the line 7—7 of FIG. 6.

In the embodiment of FIGS. 5–7, no tension members such as tension rods 39 (FIG. 2) are employed. Electrical cable 45 is the same as the electrical cable 15 of the first embodiment, having a cylindrical armor strip 47 wrapped on the exterior at an helical pitch. Expansion member 49 is a sleeve having a slit 50 for placement over electrical cable 45. Expansion member 49 has a cylindrical axial bore for closely receiving cable 15. A set of helical grooves or threads 51 is formed in the bore of each expansion member 49. Grooves 51 are formed at the same pitch as the pitch of armor strip 47.

Retainers 53 are clamped to cable 15 at each end of expansion member 49. Each retainer 53 is in two halves 53a, 53b and the halves are tightly secured to electrical cable 45 by fasteners 55. A set of helical grooves 57 is located within the bore defined by the assembled retainer halves 53a, 53b. Grooves 57 are at the same pitch and mate with armor strip 47, engaging each other in a manner similar to a threaded engagement.

A single flow tube 59 is employed to assure that hydrocarbon liquid is able to flow past expansion member 49. Flow tube 59 is a separate tube that is parallel and offset from the longitudinal axis of cable 45. Flow tube 59 is located within a groove 61 formed in the exterior of expansion member 49 parallel to the axis. Flow tube 59 in the second embodiment does not transmit tensile forces, unlike tension rods 39 of the first embodiment. Flow tube 59 is of a material resistant to expansion when contacted by hydrocarbon.

During assembly, expansion members 49 are mounted to electrical cable 45, and electrical cable 45 is inserted into coiled tubing (not shown) in the same manner as in connection with the first embodiment. When expansion members 49 undergo expansion, grooves 57 of retainers 53 prevent them from moving longitudinally apart from each other. Expansion members 49 will tightly grip electrical cable 15 and the coiled tubing to cause the coiled tubing to support the weight of the electrical cable 45.

The invention has significant advantages. The cable supports are simple in construction, not requiring any mechanical moving parts to actuate them into gripping engagement with the coiled tubing. The flow passages through the cable supports assure an adequate supply of hydrocarbon liquid to cause the swelling action of the expansion members. The retainers resist longitudinal expansion of the expansion members by directing swelling radially outward. The spacing between the cable supports may be easily changed for different electrical lines being manufactured.

While the invention has been shown in only two of its forms, it should be apparent to those skilled in the art that it is not so claimed, but is susceptible to various changes without departing from the scope of the invention.

We claim:

1. An electrical line for installation in a well, comprising:
    a metal tubing;
    an electrical cable having at least one insulated electrical conductor embedded within an elastomeric jacket, the electrical cable being inserted into the tubing;
    at least one expansion member mounted to the electrical cable the expansion member having two ends and being of a material which swells when exposed to a selected fluid medium, causing the expansion member to frictionally engage the tubing to support the weight of the electrical cable in the tubing; and
    at least one retainer positioned relative to the ends of the expansion member to resist longitudinal expansion of the expansion member during swelling.

2. The electrical line according to claim 1 further comprising a metal armor strip wrapped helically around the jacket; and wherein the retainer is clamped to the armor strip.

3. The electrical line according to claim 1 wherein the expansion member defines a sleeve encircling the electrical cable.

4. The electrical line according to claim 1 wherein:
    the retainer comprises at least two portions which are clamped together around the electrical cable by a fastener.

5. The electrical line according to claim 1, further comprising a flow channel extending from one of the ends to the other of the ends of the expansion member for the passage of the fluid medium used to cause the expansion member to swell.

6. The electrical line according to claim 1, wherein said at least one retainer comprises a pair of retainers, each located at one of the ends of the expansion member.

7. The electrical line according to claim 6, wherein said at least one expansion member comprises a plurality of expansion members spaced apart from each other along the cable.

8. The electrical line according to claim 4, further comprising a metal armor strip wrapped helically around the jacket; and wherein each of the portions of the retainer has an interior surface containing a plurality of helical grooves which mate with the armor strip.

9. The electrical line according to claim 2, wherein the expansion member defines at least a partially cylindrical interior which has a set of helical grooves for mating with the armor strip.

10. In an electrical line for installation in a well, having a continuous metal tubing surrounding an electrical cable having a plurality of insulated electrical conductors embedded within an elastomeric jacket, the improvement comprising:
    a plurality of expansion members, each of the expansion members having two ends and at least partially surrounding the electrical cable, the expansion members being longitudinally spaced apart from each other along the electrical cable, each of the expansion members being of a material which swells when exposed to a selected fluid medium, causing the expansion members to frictionally engage the tubing to support the weight of the electrical cable in the tubing; and
    a plurality of retainers, one located at each of the ends of each of the expansion members, each of the retainers being of a material which is resistant to swelling when contacted by the fluid medium, each of the retainers being divided into at least two portions, each of the portions having a partially cylindrical interior for positioning over the electrical cable; and
    at least one fastener which clamps the portions of each of the retainers tightly to the electrical cable, to resist swelling of the expansion members in longitudinal directions.

11. The electrical line according to claim 10, further comprising a flow channel extending from one of the ends to the other of the ends of each of the expansion members for the passage of the fluid medium.

12. The electrical line according to claim 10, further comprising:
    a metal armor strip wrapped around the jacket at a helical pitch; and
    wherein each of the interiors of the retainers contains grooves extending helically at the pitch of the armor strip for mating with the armor strip.

13. The electrical line according to claim 11, further comprising:
    a metal armor strip wrapped around the jacket at a helical pitch; and
    wherein the expansion members define interiors containing grooves extending helically at the pitch of the armor strip and mating with the armor strip.

14. The electrical line according to claim 10, further comprising at least one tension member extending longitudinally between each of the retainers of each of the expansion members to prevent the retainers of each of the expansion members from moving apart from one another.

15. The electrical line according to claim 10, further comprising a pair of tension rods extending between each of the retainers of each of the expansion members, the tension rods of each pair being on opposite sides of the cable.

16. A cable support for supporting electrical cable within metal well tubing, comprising:
    an expansion member having two ends and defining a cylindrical interior for closely receiving the electrical cable, the expansion member being of a material which swells when exposed to a selected fluid medium to cause the expansion member to frictionally engage the tubing to support the weight of the electrical cable in the tubing; and at least one retainer positioned relative to the ends of the expansion member to resist longitudinal expansion of the expansion member during swelling.

17. The cable support of claim 16, further comprising:

at least one fastener for clamping the retainer tightly to the electrical cable.

18. The cable support according to claim 16, further comprising:

a metal armor strip wrapped around the jacket at a helical pitch; and wherein the interior of the retainer contains grooves extending helically at the pitch of the armor strip for mating with the armor strip.

19. The cable support according to claim 16, further comprising a flow passage extending longitudinally through the expansion member for the passage of the fluid medium.

20. A method of installing an electrical cable within tubing for use in a well, the electrical cable having at least one insulated electrical conductor embedded within an elastomeric jacket, comprising:

(a) providing at least one expansion member, the expansion member having two ends and being of a material which swells when exposed to a selected fluid medium;

(b) securing a retainer to the expansion member and mounting the expansion member to the electrical cable; then (c) inserting the electrical cable into the tubing; then (d) pumping the fluid medium through the tubing, which contacts and causes the expansion member to swell, and resisting with the retainer longitudinal expansion of the ends of the expansion member, causing the expansion member to expand radially into frictional engagement with the tubing.

* * * * *